United States Patent
Paunescu et al.

(10) Patent No.: US 7,380,757 B2
(45) Date of Patent: Jun. 3, 2008

(54) ADJUSTABLE SUPPORT FOR CABLE TRAY

(75) Inventors: Adrian Paunescu, Brossard (CA); William Smith, Kirkland (CA)

(73) Assignee: Thomas & Betts International, Inc., Wilmington, DE (US)

( * ) Notice: Subject to any disclaimer, the term of this patent is extended or adjusted under 35 U.S.C. 154(b) by 25 days.

(21) Appl. No.: 11/434,863

(22) Filed: May 16, 2006

(65) Prior Publication Data

US 2006/0255211 A1 Nov. 16, 2006

Related U.S. Application Data

(60) Provisional application No. 60/681,324, filed on May 16, 2005.

(51) Int. Cl.
*F16L 3/00* (2006.01)

(52) U.S. Cl. ...................................................... 248/49

(58) Field of Classification Search .................. 248/49, 248/65, 67.7, 70; 174/68.3; 52/220.1; 211/26
See application file for complete search history.

(56) References Cited

U.S. PATENT DOCUMENTS

| | | | | |
|---|---|---|---|---|
| 3,288,400 A | * | 11/1966 | Nazir | ......................... 244/218 |
| 3,712,652 A | * | 1/1973 | Uilkema | ...................... 403/108 |
| 3,784,042 A | | 1/1974 | Hadfield et al. | |
| 3,844,440 A | | 10/1974 | Hadfield et al. | |
| 4,098,476 A | * | 7/1978 | Jutte et al. | ................... 248/694 |
| 4,876,834 A | | 10/1989 | Domigan | |
| 4,899,506 A | | 2/1990 | Chapman et al. | |
| 5,003,737 A | | 4/1991 | Penczak | |
| 5,049,700 A | | 9/1991 | Kobayashi et al. | |
| 5,546,717 A | | 8/1996 | Penczak et al. | |
| 5,548,932 A | | 8/1996 | Mead | |
| 5,857,650 A | * | 1/1999 | Lin | ......................... 248/188.5 |
| 6,521,835 B1 | | 2/2003 | Walsh | |
| 6,776,379 B2 | * | 8/2004 | Sherer et al. | ................ 248/150 |
| 6,811,130 B1 | * | 11/2004 | Oh | .............................. 248/343 |
| 7,063,311 B1 | * | 6/2006 | Ascolese | ...................... 269/69 |
| 2004/0056155 A1 | * | 3/2004 | Chen et al. | ..................... 248/49 |
| 2004/0079711 A1 | * | 4/2004 | Hartman et al. | ............... 211/26 |
| 2006/0081735 A1 | * | 4/2006 | Chen et al. | ................ 248/68.1 |
| 2006/0113433 A1 | * | 6/2006 | Chen et al. | ..................... 248/70 |

* cited by examiner

*Primary Examiner*—Ramon O Ramirez
(74) *Attorney, Agent, or Firm*—Hoffmann & Baron, LLP

(57) ABSTRACT

An adjustable support for cable tray installation. The support includes first and second posts, the posts being adapted for securement to a building surface. The support further includes an elongated bracket having a generally centrally located hinge and first and second generally opposing legs. The legs of the bracket engage the posts along at least one predefined engagement region. The support further includes a first securing mechanism located in the engagement region for locating the bracket with respect to the post during installation of the cable tray. Finally, the support includes a second securing mechanism for fixing the location of the bracket with respect to the posts upon final positioning of the cable tray.

19 Claims, 5 Drawing Sheets

ADJUSTABLE SUPPORT FOR CABLE TRAY

CROSS-REFERENCE TO RELATED APPLICATIONS

This application claims the benefit of U.S. Provisional Patent Application Ser. No. 60/681,324 filed on May 16, 2005.

FIELD OF THE INVENTION

This invention relates to a cable tray support for use in supporting cable tray above or adjacent a building surface and, more specifically, to a cable tray support that is field adjustable, has built-in redundancy to prevent disassembly and which can provide initial support during installation of the cable tray.

BACKGROUND OF THE INVENTION

As will be recognized by those skilled in the art, cable tray is commonly used to support wire, cable, pipe, etc. as they are run both inside and outside of buildings. Many different designs for cable tray exist ranging from the more traditional 'ladder' type, to solid tray and/or to open weave or 'basket' tray. The configuration or cross-section of cable tray varies considerably, with some cable tray incorporating a more pronounced lip, while others are deeper or wider. Hence, there are numerous variations of cable tray an installer can choose from, depending on the circumstances.

One feature that is common to all such cable tray, however, is the need to be supported. Some cable tray are suspended from an overhead structure (i.e., beam, ceiling, threaded rod, etc.), while others are supported from below or along their sides. Thus, due to the variations in the cable tray itself, the supporting hardware for such tray has become specialized. Consequently, the prior art has been unable to provide a universal support for cable tray, i.e., a single support that can be used with many different types of cable tray. This has of course increased the costs associated with such installations.

Regardless of whether the cable tray is to be supported from a wall, floor or ceiling, the need to initially support the cable tray during the installation of such cable tray is of great importance. For example, if the cable tray is not initially supported during the layout, the distance between the cable tray and the supporting building surface will likely vary along the run, giving the completed job an uneven or wavy appearance. This initial support also allows the installer to ensure that the section of tray to be installed aligns properly with the cable tray already installed and with the supporting building surface.

Furthermore, as is also quite common, the floor, ceiling or wall surfaces from which the cable tray is supported may not be perfectly planar or flat. Hence, if using supports that are pre-fixed to the cable tray or which are pre-assembled to a certain height, such differences in the building surface can result in similar differences in the cable tray run (which may be unsightly).

To complicate matters even more, there may also be variations or differences in the building surfaces transverse to the cable tray run. This will occur when the cable tray extends along a break or step or when the building surface slopes underneath the cable tray. Hence, one side of the cable tray will be at one spacing with respect to the building surface while the other side of the cable tray will be at another spacing from the building surface. Thus, there is a need in the art for a cable tray support which is field adjustable.

Finally, there are applications and/or installations where the components of the cable tray may become detached due the loosening of fasteners (e.g., from vibration), from being jarred, or for various other reasons. Ideally, such situations can be avoided through careful installation and/or inspection. Nonetheless, the prior art has failed to provide a cable tray support which resists disassembly in the event that a fastener(s) is loosened.

Thus, it is an object of this invention to provide a support that is inexpensive to manufacture and which can readily be installed. A further object of this invention is to provide a support which can be field adjusted so as to accommodate variations in the distance between the height of the cable tray and the building surface. Still another object of this invention is to provide a support that is capable of initially supporting the cable tray during installation. Yet another object of this invention is to provide a support that has built-in redundancy for enhanced strength and safety. These and other advantages and objects of this invention will become obvious upon further review and investigation.

SUMMARY OF THE INVENTION

The present invention, which addresses the needs for the prior art, relates to an adjustable support for a cable tray. The support includes first and second posts. The posts are adapted for securement to a building surface. At least one of the posts defines an engagement region. The support further includes an elongated bracket having a generally centrally located hinge and first and second generally opposing legs. The legs extend from opposing sides of the hinge at a pre-selected angle. At least one of the legs defines an engagement region. The engagement region of the post adjustably engages the engagement region of the leg. The support further includes a first securing mechanism located in the engagement region for locating the bracket with respect to the post during installation of the cable tray. Finally, the support includes a second securing mechanism for fixing the location of the bracket with respect to the post upon final positioning of the able tray.

As a result, the present invention provides a field adjustable support for cable tray which can initially support the cable tray during the installation process. This same support has built in redundancy for enhanced strength and safety. Finally, the support of the present invention is cost effective to manufacture and readily installed.

DETAILED DESCRIPTION OF THE INVENTION

Figure 1:
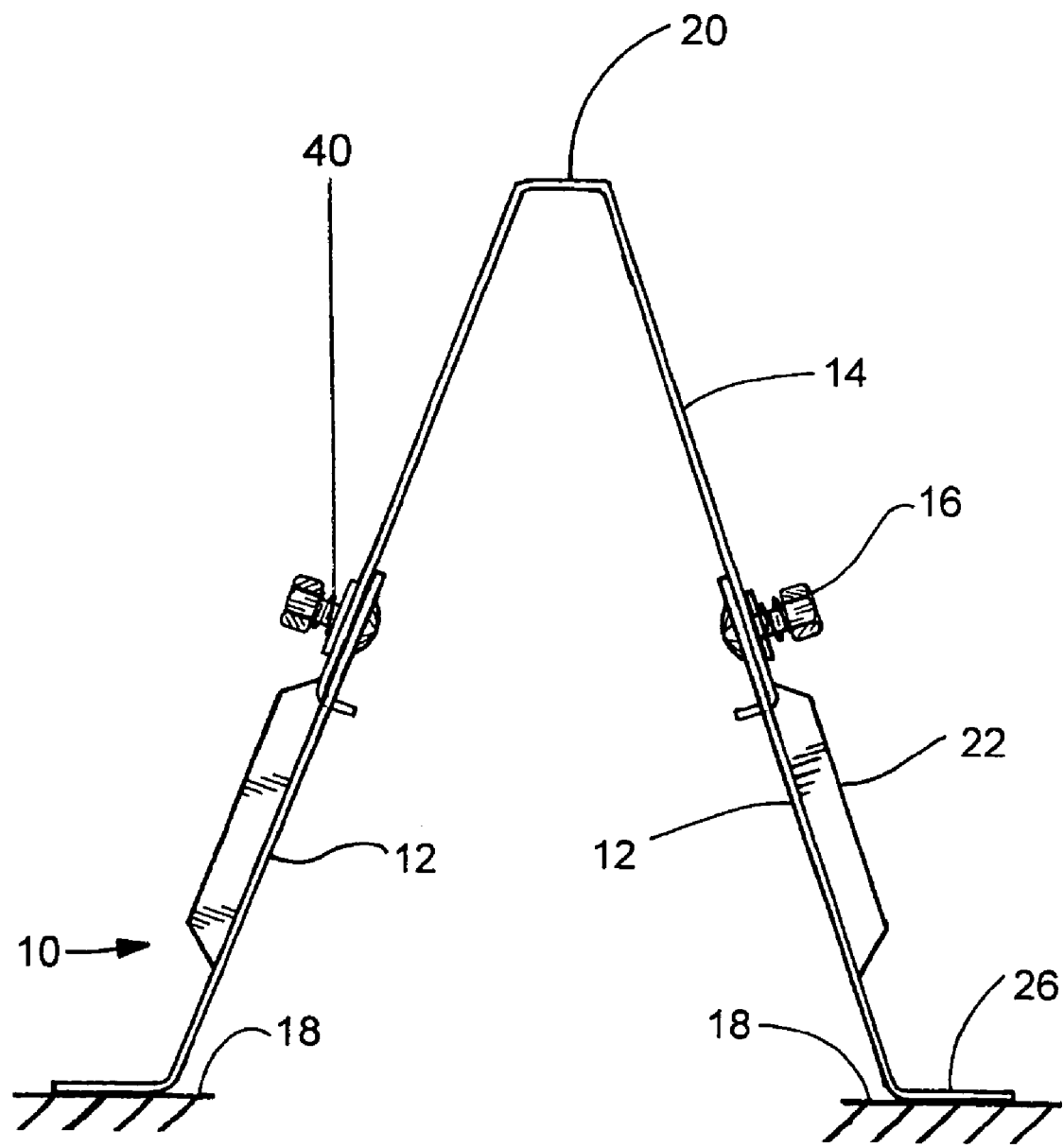
FIG. 1 is a front elevation view of the stand of the present invention in its extended state.

Referring initially to FIG. 1, a cable tray support 10 is shown in its fully extended state. Support 10 preferably includes a pair of posts 12, a bracket 14 and hardware 16. Posts 12 are adapted to be fastened to a supporting building surface, i.e., floor 18.

Figure 2:
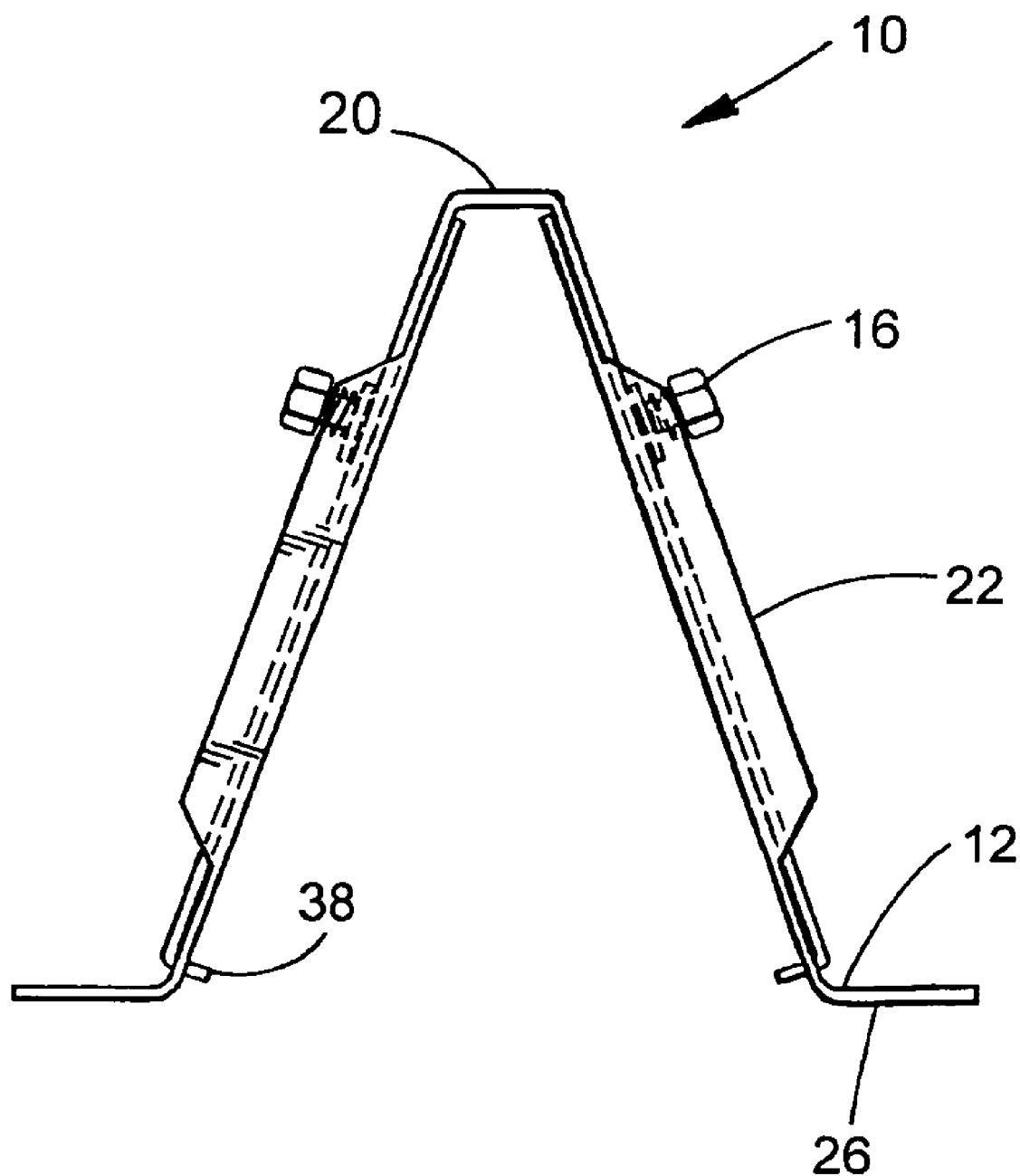
FIG. 2 is a front elevation view of the stand of the present invention in its retracted state.

As discussed further hereinbelow, support 10 can be adjusted in height as may be needed. As shown in FIGS. 1 and 2, the distance between the cable tray support region 20 and the floor 18 can be varied between a maximum height (see FIG. 1) and a minimum height (see FIG. 2). It is contemplated herein that the supporting building surface be uneven, and thus posts 12 may be secured at different elevations.

Figures 3, 4:
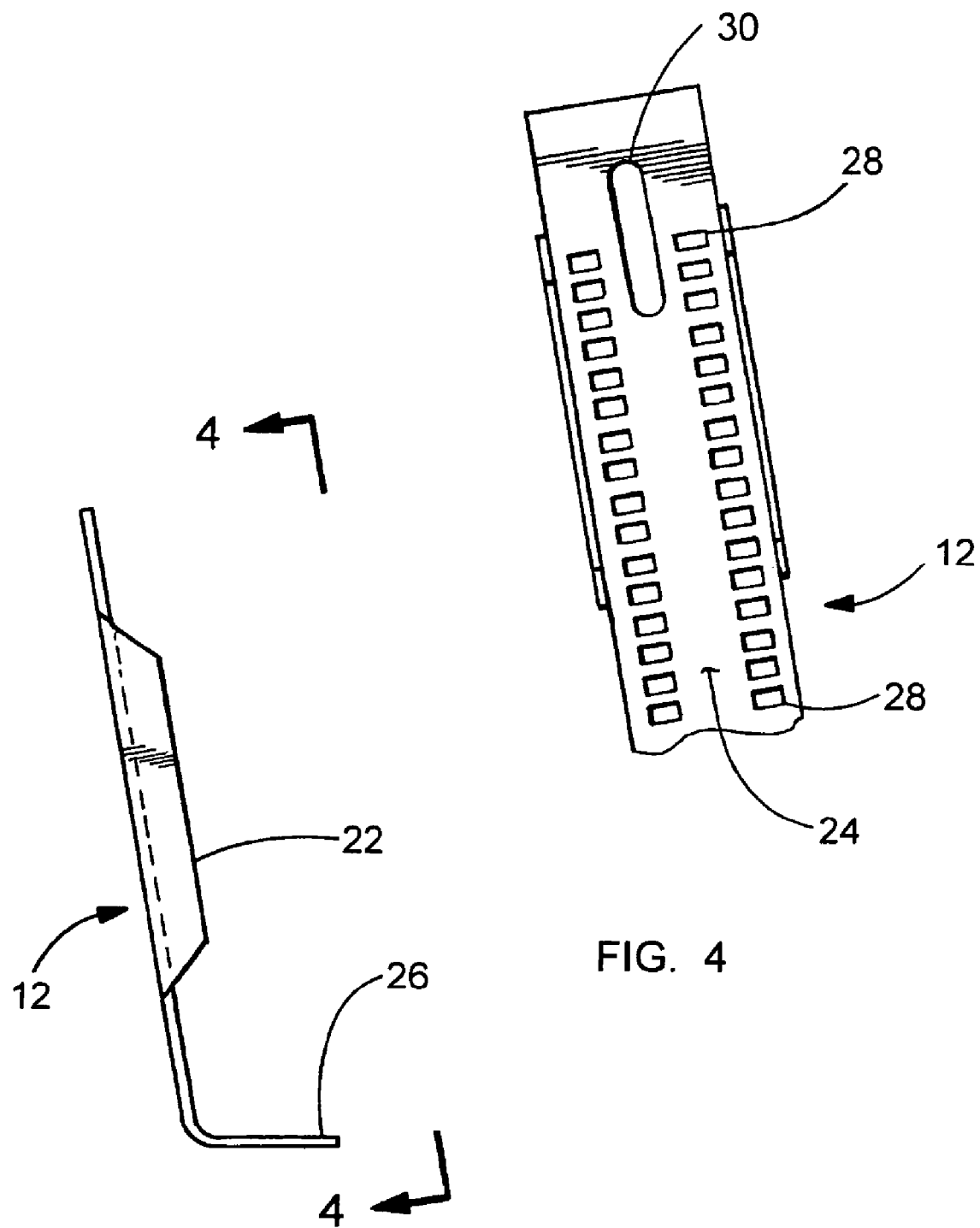
FIG. 3 is a detail of one of the posts of the present stand.
FIG. 4 is a view taken along lines 4-4 of FIG. 3.

Referring now to FIGS. 3 and 4, each post 12 is preferably formed as a generally flat rectangular member, made of metal or other suitable material. The opposite longitudinal sides of posts 12 are preferably formed with stiffening edges 22, which extend from surfaces 24 at an approximately 90° angle. These edges 22 provide additional rigidity to posts 12, as well as provide a guide for slidably receiving bracket 14. Bracket 14 is also preferably formed as a generally flat rectangular member, made of metal or other suitable material.

The ends of posts 12 are preferably angled to form feet 26, which extend generally parallel to floor 18. As shown, the angle between feet 26 and surfaces 24 is preferably greater than 90 degrees. Each of feet 26 preferably includes a slot or other opening (not shown) to accommodate a fastener. The fastener is used to securely anchor feet 26 (and hence posts 12) to the building surface. Of course, feet 26 can be angled and/or shaped to cooperate with various building surfaces.

As shown in FIG. 4, each of surfaces 24 is perforated with a plurality of spaced openings 28. While two rows of such openings 28 are shown, the number may actually be more or less. Each of surfaces 24 further includes an oblong fastener slot 30 for passage of a bolt (included in hardware 16) therethrough. Preferably, each of posts 12 is of identical construction.

Figure 6:
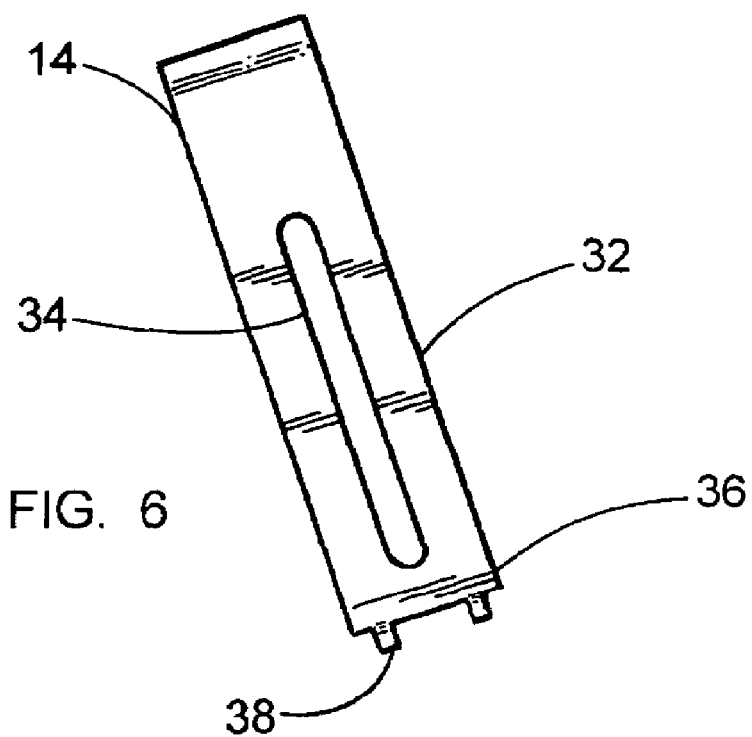
FIG. 6 is a view taken along lines 6-6 of FIG. 5.
Figure 5:
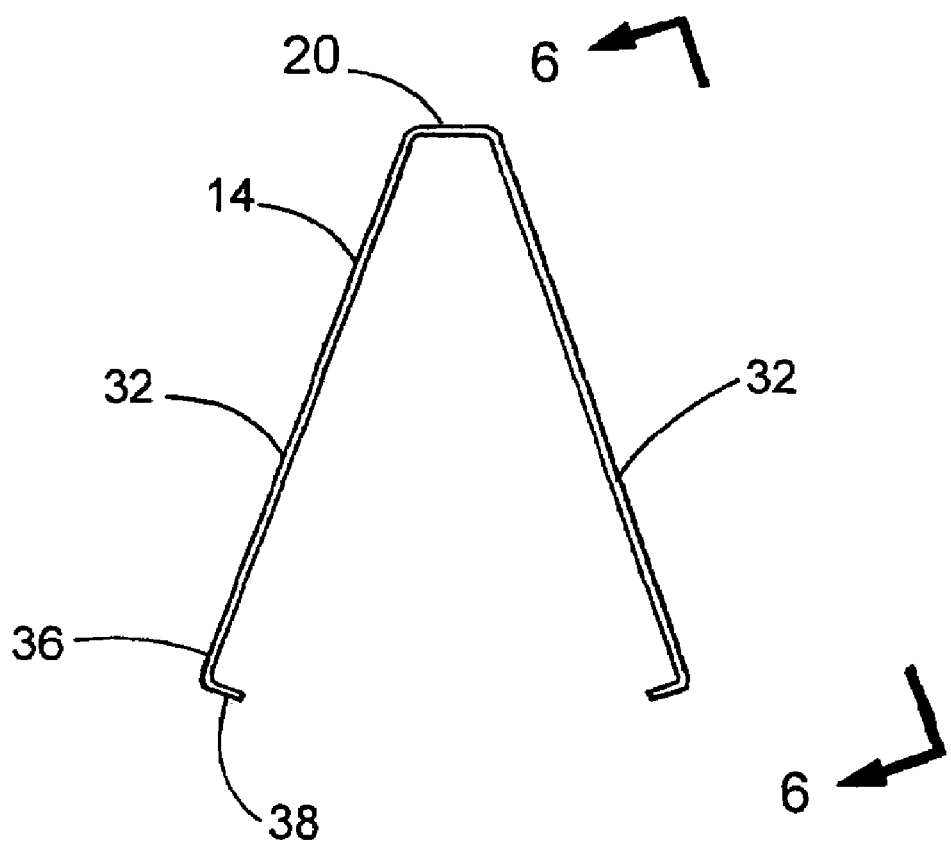
FIG. 5 is a detail of the bracket of the present stand.

Referring now to FIGS. 5 and 6, bracket 14 is preferably formed of a one-piece construction, wherein opposing legs 32 are joined together by a hinge, i.e., support region 20. These opposing legs 32 preferably diverge away from each other as they extend from support region 20. Support region 20 is designed to provide a surface that can be used to support the cable tray (both initially and after assembly), or to which additional hardware (e.g., hanger 42) to accomplish such support can be fastened. Support region 20 may also be configured to prevent or restrict legs 32 of bracket 14 from being outwardly splayed. Alternate embodiments of bracket 14 may be U-shaped (with legs 32 either diverging as above or remaining parallel to each other) or bracket 14 may have legs 32 that are generally perpendicular to support region 20.

Referring to FIG. 6, each of legs 32 preferably contains an elongated fastener slot 34 that aligns with fastener slots 30 in posts 12 for passage of hardware 16 therethrough. Hardware 16 is preferably tightened after the cable tray has been properly located and positioned, whereupon the bracket is fixed with respect to the posts thus maintaining support region 20 at a preselected distance from the building surface.

In one preferred embodiment, the distal ends 36 of legs 32 are provided with tabs 38. Each of tabs 38 extends generally perpendicular to leg 32, and preferably toward one another. Tabs 38 are configured to fit within openings 28 of posts 12, thus securing bracket 14 to posts 12. It is contemplated herein that tabs 38 can be hook-shaped (not shown) or otherwise modified to further enhance the cooperation of such tabs with openings 28. Of course, other structure (e.g., ratchet mechanisms) for adjustably coupling bracket 14 to posts 12 is also contemplated.

In one preferred embodiment, support 10 is provided as an assembled unit (i.e., with posts 12 secured to bracket 14 via hardware 16). A spring 40 is preferably installed under each nut included in hardware 16. A user can thus adjust the support by compressing springs 40 and manipulating posts 12 so as to position tabs 38 within a set of preselected the desired openings 28 prior to installation. Bracket 14 may be secured to the cable tray via a bolt passing through support region 20 or via another piece of hardware (e.g., hanger 42) secured to support region 20. Re-adjustment of tabs 38 into different openings 28 can be readily accommodated if need be during assembly.

Figure 7:
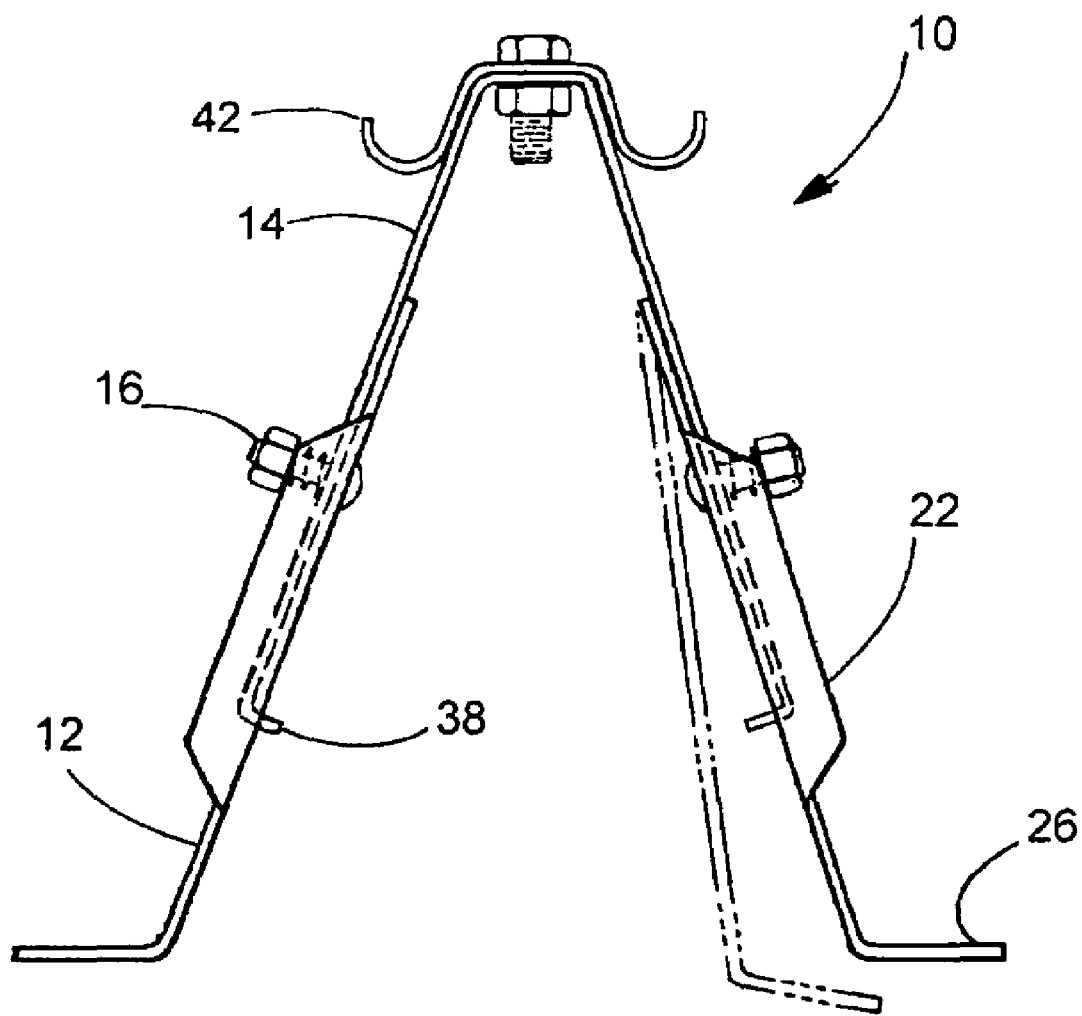
FIG. 7 is a front elevation view of the stand of the present invention with attached hardware.

Those skilled in the art will appreciate that the bias imparted by spring 40 ensures that tabs 38 remain retained within openings 28. Thus, prior to tightening of hardware 16, the user is able to adjust and/or re-adjust the position of one or more posts 12 with respect to bracket 14 as indicated in dotted lines in FIG. 7. The user simply compresses spring 40 and manipulates post 12 away from bracket 14 till tab 38 clears opening 28. Thereafter, the post 12 may be re-positioned to the desired location along bracket 14. This thus enables the installer to make adjustments as needed before any final tightening or anchoring occurs (such adjustments being more difficult after this tightening or anchoring occurs).

Cable tray support 10 thus includes built-in redundancy regarding its ability to support the cable tray from or above the building surface and resist forces thereon. First, the tightening of hardware 16 provides a secure connection between posts 12 and bracket 14. However, in the unlikely event that hardware 16 loosens, the bias imparted by bracket 14 and/or spring 40 ensures that tabs 38 remain engaged with openings 28, thus maintaining the stand in its originally installed state. Thus, the cable tray remains fully supported even if hardware 16 were to loosen, or even completely unthread.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. An adjustable support for a cable tray, comprising:
   first and second posts, said posts being adapted for securement to a building surface, at least one of said posts defining an engagement region;
   an elongated bracket having a generally centrally located hinge and first and second generally opposing legs, said legs extending from opposing sides of said hinge at a preselected angle, at least one of said legs defining an engagement region, and wherein said engagement region of said post adjustably engages said engagement region of said leg;
   a first securing mechanism located in said engagement region for locating said bracket with respect to said posts during installation of said cable tray, wherein said first securing mechanism includes:

a plurality of spaced openings located in said engagement region and formed in one of said leg and said post; and at least one tab for engaging said openings located in said engagement region and formed on the other of said leg and said post; and a second securing mechanism for fixing the location of said bracket with respect to said posts upon final positioning of said cable tray.

2. The support according to claim 1, wherein said spaced openings are located on said post defining said engagement region and said tabs are located on said leg defining said engagement region.

3. The support according to claim 1, wherein the second securing mechanism includes hardware for locking said post to said leg in a pre-selected position.

4. The support according to claim 3, wherein each of said posts defines an engagement region, and wherein each of said legs defines an engagement region, the engagement region of said first post adjustably engaging the engagement region of said first leg and the engagement region of said second post adjustably engaging the engagement region of said second leg.

5. The support according to claim 3, wherein said second securing mechanism further includes a slotted opening in at least one of the posts and in at least one of the legs for passage of said hardware therethrough.

6. The support according to claim 5, wherein said second securing mechanism further includes a spring for urging at least one of said legs into contact with at least one of said posts.

7. The support according to claim 4, wherein each of said posts includes spaced openings within said engagement regions, and wherein each of said legs includes tabs within said engagement region.

8. The support according to claim 7, wherein each of said legs is formed as a generally flat rectangular body having inner and outer surfaces, and wherein each of said posts is formed as a generally flat rectangular body having inner and outer surfaces.

9. The support according to claim 8, wherein said legs of said bracket diverge in a direction away from said hinge, said legs being biased towards each other; and wherein the inner surfaces of said legs engage the outer surfaces of said posts.

10. The support according to claim 9, wherein said posts include at least one angled edge for enhanced rigidity.

11. The support according to claim 10, wherein said posts include opposing angled edges configured to slidably receive said legs therebetween.

12. A support for cable tray, comprising:

a bracket having two diverging legs extending from a support region, wherein at least one leg has a first fastener opening therein;

at least one post having a second fastener opening therein, the first and second fastener openings overlapping and allowing a fastener to extend therethrough when the post and the leg abut;

a first mating structure on the bracket; and a second mating structure on the past; and a spring biasing the first and second mating structure together, wherein the first and second mating structures are in engagement when the post and the leg abut, the first and second mating structures maintaining the post and the bracket together.

13. The support according to claim 12, wherein the spring is a coil spring and the coil spring is positioned around the fastener.

14. The support according to claim 12, wherein the post is configured with at least one stiffener to provide rigidity thereto.

15. The support according to claim 12, wherein the post is configured with an angled distal end region, the angled distal end region being bent at an angle greater than 90 degrees.

16. The support according to claim 12, wherein one of the mating structures comprises a tab and wherein the other mating structure comprises a plurality of openings configured to accept the tab therein.

17. The support according to claim 12, wherein the bracket is rigid.

18. The support according to claim 17, wherein the bracket is of one piece construction.

19. An adjustable support for a cable tray, comprising:

first and second posts, said posts being adapted for securement to a building surface, at least one of said posts defining an engagement region, wherein the at least one said post is configured with an angled distal end region, the angled distal end region being bent at an angle greater than 90 degrees;

an elongated bracket having a generally centrally located hinge and first and second generally opposing legs, said legs extending from opposing sides of said hinge at a preselected angle, at least one of said legs defining an engagement region, and wherein said engagement region of said post adjustably engages said engagement region of said leg;

a first securing mechanism located in said engagement region for locating said bracket with respect to said posts during installation of said cable tray; and a second securing mechanism for fixing the location of said bracket with respect to said posts upon final positioning of said cable tray.

* * * * *